US 11,555,495 B2

(12) United States Patent
Fonte et al.

(10) Patent No.: US 11,555,495 B2
(45) Date of Patent: Jan. 17, 2023

(54) FLUID EQUALISATION FOR MULTIPLE COMPRESSORS

(71) Applicant: Carrier Corporation, Palm Beach Gardens, FL (US)

(72) Inventors: Nicolas Fonte, Montluel (FR); Yvan Alquier, Montluel (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 16 days.

(21) Appl. No.: 17/123,287

(22) Filed: Dec. 16, 2020

(65) Prior Publication Data
US 2021/0239119 A1 Aug. 5, 2021

(30) Foreign Application Priority Data
Feb. 4, 2020 (EP) .................................. 20155445

(51) Int. Cl.
*F04C 29/12* (2006.01)
*F04C 11/00* (2006.01)
(Continued)

(52) U.S. Cl.
CPC ............ *F04C 29/12* (2013.01); *F04C 11/001* (2013.01); *F04C 18/0207* (2013.01);
(Continued)

(58) Field of Classification Search
CPC .... F04C 29/12; F04C 11/001; F04C 18/0207; F04C 2210/206; F04C 2230/00;
(Continued)

(56) References Cited

U.S. PATENT DOCUMENTS 4,551,989 A * 11/1985 Lindahl ............... F04B 39/0246
62/468
9,939,179 B2 * 4/2018 Fraser .................. F25B 31/026
(Continued)

FOREIGN PATENT DOCUMENTS

EP 1740834 A1 1/2007
WO 2011057783 A1 5/2011

OTHER PUBLICATIONS

European Search Report for Application No. 20155445.8; dated Aug. 7, 2020; 8 Pages.

*Primary Examiner* — Dominick L Plakkoottam
*Assistant Examiner* — Paul W Thiede
(74) *Attorney, Agent, or Firm* — Cantor Colburn LLP

(57) ABSTRACT

A method of manufacturing a suction pipe for a multi-compressor device having a plurality of inlets, the suction pipe comprising a primary portion and a plurality of secondary portions arranged to receive fluid from the primary portion for supplying fluid in parallel to the inlets of a multi-compressor device. The method includes designing the suction pipe by: selecting a first dimension for the primary portion of the suction pipe, calculating a first fluid velocity for fluid in the primary portion based on the first dimension, and comparing the first fluid velocity to a first predetermined threshold; selecting a second dimension for the secondary portions, calculating a second fluid velocity for fluid in the secondary portions based on the second dimension, and comparing the second fluid velocity to a second predetermined threshold; and calculating a ratio of the first fluid velocity to the second fluid velocity.

15 Claims, 2 Drawing Sheets

(51) Int. Cl.
*F04C 18/02* (2006.01)
*F16L 41/02* (2006.01)
*F25B 1/10* (2006.01)

(52) U.S. Cl.
CPC ...... *F16L 41/021* (2013.01); *F04C 2210/206* (2013.01); *F04C 2230/00* (2013.01); *F04C 2240/806* (2013.01); *F04C 2250/101* (2013.01); *F04C 2270/205* (2013.01); *F16L 41/023* (2013.01); *F25B 1/10* (2013.01)

(58) Field of Classification Search
CPC .......... F04C 2240/806; F04C 2250/101; F04C 2270/205; F16L 41/021; F16L 41/023; F25B 1/10; F25B 31/026
See application file for complete search history.

(56) References Cited

U.S. PATENT DOCUMENTS

| | | | | |
|---|---|---|---|---|
| 2005/0229627 | A1* | 10/2005 | De Bernardi | F25B 31/002 |
| | | | | 62/468 |
| 2012/0017636 | A1 | 1/2012 | Wada et al. | |
| 2013/0098268 | A1 | 4/2013 | Li et al. | |
| 2014/0037484 | A1* | 2/2014 | Fraser | F04C 18/0215 |
| | | | | 418/83 |
| 2016/0053828 | A1* | 2/2016 | Ookuma | F16D 27/004 |
| | | | | 192/84.31 |

* cited by examiner

FLUID EQUALISATION FOR MULTIPLE COMPRESSORS

FOREIGN PRIORITY

This application claims priority to European Patent Application No. 20155445.8, filed Feb. 4, 2020, and all the benefits accruing therefrom under 35 U.S.C. § 119, the contents of which in its entirety are herein incorporated by reference.

TECHNICAL FIELD

The invention relates to a method of manufacturing a suction pipe for a multi-compressor device, particularly to a method comprising designing a suction pipe.

BACKGROUND

Multi-compressor devices—such as multi-scroll compressors and multi-rotary compressors—are used in a wide variety of applications, and employ suction pipes immediately upstream to partition fluid and/or oil flow between respective inlets of the multi-compressor's different stages. FIG. 1 shows a suction pipe 100 for a multi-compressor device that receives fluid flow into a primary portion 110, and divides that flow into four secondary portions 120, each secondary portion 120 arranged for providing fluid to a different inlet of a multi-compressor device. Suction pipes therefore affect fluid and/or oil distribution across different stages of multi-compressor devices.

Existing design methods for designing suction pipes are aimed at minimising the pressure drop in the suction pipe during operation. As such, the methods emphasise suction pipes with larger diameters, which are then necessarily configured to operate with lower fluid velocities (e.g. around 8 meters per second or less). However, for suction pipes with three or four secondary portions, the designs resulting from such methods are highly sensitive to variations between the different portions. For example, small differences in geometries between the secondary portions (e.g. caused by manufacturing tolerances) result in significant differences in distribution. For example, a greater portion of fluid may be provided to the secondary portion first encountered by the fluid flow, with less fluid provided to the next secondary portion, and even less provided to the third, and so on. Unequal distribution can cause lubrication issues leading to compressor fatigue, wear and even failure (e.g. too little oil), as well as a loss of efficiency (e.g. too much).

Therefore, multiple iterations of a suction pipe are typically needed to arrive at a viable design. Even then, it is still necessary to include restrictors devices in the secondary portions to ensure the correct pressure drop is achieved and hence that the correct fluid distribution is obtained.

Thus, existing methods of designing and manufacturing suctions pipes for multi-compressor devices are time consuming, inefficient, and unreliable. Improvements in designing and manufacturing suction pipes for multi-compressor devices are therefore desirable.

SUMMARY

According to a first aspect of the invention there is provided a method of manufacturing a suction pipe for a multi-compressor device having a plurality of inlets, the suction pipe comprising a primary portion and a plurality of secondary portions arranged to receive fluid from the primary portion for supplying fluid in parallel to the inlets of a multi-compressor device; the method comprising designing the suction pipe by: selecting a first dimension for the primary portion of the suction pipe, calculating a first fluid velocity for fluid in the primary portion based on the first dimension, and comparing the first fluid velocity to a first predetermined threshold; selecting a second dimension for the secondary portions, calculating a second fluid velocity for fluid in the secondary portions based on the second dimension, and comparing the second fluid velocity to a second predetermined threshold; and calculating a ratio of the first fluid velocity to the second fluid velocity; the method further comprising: manufacturing the suction pipe according to the selected first dimension and second dimension if the first fluid velocity is greater than the first predetermined threshold, if the second fluid velocity is greater than the second predetermined threshold, and if the ratio of the first fluid velocity to the second fluid velocity is greater than 1.5.

In contrast to known methods for manufacturing and designing suctions pipes for multi-compressor devices, the method disclosed herein relies upon ensuring minimum fluid velocity thresholds in the portions of the suction pipe during use, as well as a minimum ratio between fluid velocities in the primary and secondary portions of the suction pipe. Thus, whereas known design methods minimise pressure drops within the suction pipe, the present method ensures sufficient pressure drops in the suction pipe in order to ensure high enough fluid velocities, and thereby provide robust fluid distribution. As a result of the design, dynamic effects will dominate over static effects, leading to increased robustness of fluid distribution.

The design process also significantly reduces the effect of geometry variations between portions of the suction pipe on fluid distribution. As such, geometry imperfections in the suction pipe do not cause unequal fluid distribution between compressor stages. By ensuring minimum fluid velocities, as well as a minimum relationship between velocities in different portions of the suction pipe, even fluid distribution is achieved. Then, as a result of the method described herein, the need for restrictor devices may be eliminated.

The method may include manufacturing a suction pipe for a multi-compressor device of a heating, ventilation and air conditioning (HVAC) system. The method may therefore extend to designing and manufacturing a heating and/or cooling system. The method may comprise manufacturing a suction pipe for a multi-scroll compressor. The method may comprise manufacturing a suction pipe for a multi-rotary compressor. The method may comprise manufacturing a suction pipe for a multi-compressor device comprising three stages, four stages, five stages, or more.

The method may comprise manufacturing the suction pipe if and only if the first fluid velocity is greater than the first predetermined threshold, the second fluid velocity is greater than the second predetermined threshold, and the ratio of the first fluid velocity to the second fluid velocity is greater than 1.5. The method may comprise not manufacturing the suction pipe if the first fluid velocity is less than the first predetermined threshold, or if the second fluid velocity is less than the second predetermined threshold, or if the ratio of fluid velocities is less than 1.5. That is, the method may comprise manufacturing the suction pipe only if the three criteria are satisfied, and otherwise not manufacturing the suction pipe (i.e. if any of the three design criteria are not satisfied).

The calculation of the first and second fluid velocities may be for a given system e.g. comprising a predetermined multi-compressor device under predetermined operation conditions. The first and second fluid velocities may be first and second oil velocities respectively. The calculation of the fluid velocities may be for full load conditions e.g. during use of the suction pipe in a predetermined system. The method may include selecting parameters for the system that the suctions pipe is to be used in, and calculation of the fluid velocities may be based on those parameters.

The first dimension of the primary portion of the suction pipe may be any suitable physical dimension of the primary portion that affects fluid velocity therein. The first dimension may be size, length, width, bore, volume, angle, and so on. The first dimension may be the internal diameter of the primary portion. The internal diameter of the primary portion may be substantially constant for example, except where it connects to a secondary portion.

The second dimension of the secondary portion of the suction pipe may be any suitable dimension of the secondary portion that affects fluid velocity therein. The second dimension may be size, length, width, bore, volume, angle, and so on. The second dimension may be the angle between the secondary portion and the primary portion where they are connected. The second dimension may be the internal diameter of the secondary portion. The internal diameter of the secondary portion may be substantially constant for example, except where it connects to a primary portion, or where it is adapted to connect to the multi-compressor device. Each secondary portion may be similar to the others, and may be substantially identical to the others.

The method may comprise changing the selected first dimension of the primary portion and recalculating the first fluid velocity if the initially calculated first fluid velocity is not greater than the first predetermined threshold. The method may comprise changing the selected first dimension to increase the fluid velocity in the primary portion during use. The method may comprise selecting the first dimension of the primary portion to ensure that the calculated fluid velocity is greater than the first predetermined threshold.

The method may comprise changing the selected second dimension of the secondary portion and recalculating the second fluid velocity if the initially calculated second fluid velocity is not greater than the second predetermined threshold. The method may comprise changing the selected second dimension to increase the fluid velocity in the secondary portion during use. The method may comprise selecting the second dimension of the secondary portion to ensure that the calculated second fluid velocity is greater than the second predetermined threshold.

The method may comprise changing either or both of the first dimension and the second dimension, recalculating the first and second fluid velocities, and recalculating the ratio of the first fluid velocity to the second fluid velocity if the initially calculated ratio is not greater than 1.5. The method may comprise selecting the first and second dimensions to ensure that the calculated ratio is greater than 1.5.

The method may comprise using a ratio of 1.50, and the method may therefore comprise manufacturing the suction pipe only if the ratio of fluid velocities is greater than 1.50.

The method may comprise selecting a plurality of dimensions for the primary portion and calculating the first fluid velocity based on the plurality of dimensions. The method may comprise selecting a plurality of dimensions for the secondary portions and calculating the second fluid velocity based on the plurality of dimensions.

The method may comprise manufacturing a suction pipe for a multi-compressor device and/or a multi-scroll compressor for use with a high-pressure refrigerant. The high pressure refrigerant may be R32, R454B, R452B, and/or R410A, or any suitable high pressure refrigerant.

The first predetermined threshold may be 18 meters per second. The first predetermined threshold may be 18.0 meters per second. Alternatively, the first predetermined threshold may be 15 meters per second, or may be 16 meters per second, or may be 17 meters per second.

The second predetermined threshold may be 12 meters per second. The second predetermined threshold may be 12.0 meters per second. Alternatively, the second predetermined threshold may be 10 meters per second, or may be 11 meters per second.

Fluid velocities in known systems are typically in the region of 8 meters per second or less. The criteria for fluid velocities used in the method herein are therefore significantly greater than in known suction pipes, and result in significant increases in pressure drops within the suction pipe. Moreover, the combination of the three thresholds of (i) 18 meters per second for the first fluid velocity in the primary portion, (ii) 12 meters per second for the second fluid velocity in the secondary portions, and (iii) a ratio of 1.5 of the first fluid velocity to the second fluid velocity, has been found to be broadly applicable to a wide range of systems and particularly effective in providing viable suction pipe designs with a high rate of success. The method therefore increases the likelihood of a design being viable and prevents the need for iteration of the designs.

Indeed, the design method is so effective that suction pipes with multiple secondary portions can be quickly and efficiently designed e.g. in a single iteration. Therefore, the step of designing the suction pipe may comprise designing the suction pipe to have three or more secondary portions. The method may therefore comprise manufacturing the suction pipe to have three or more secondary portions. The suction pipe may therefore be used to evenly distribute fluid to a three-stage compressor.

The step of designing the suction pipe may comprise designing the suction pipe to have four or more secondary portions. The method may therefore comprise manufacturing the suction pipe to have four or more secondary portions. The suction pipe may therefore be used to evenly distribute fluid to a four-stage compressor.

Indeed, the method provides viable suction pipes having more secondary portions than have previously been possible. Known suctions pipes have a maximum of four secondary portions due to the challenges faced in achieving even fluid distribution. Using the method described herein, suction pipes with five secondary portions have successfully been designed. The step of designing the suction pipe may comprise designing the suction pipe to have five or more secondary portions. The method may therefore comprise manufacturing the suction pipe to have five or more secondary portions. Suctions pipes with five secondary portions have not previously been feasible. The suction pipe may therefore be used to evenly distribute fluid to a five-stage compressor.

The step of designing the suction pipe may comprise designing the suction pipe to have six or more secondary portions. The method may therefore comprise manufacturing the suction pipe to have six or more secondary portions. Suctions pipes with six secondary portions have not previously been feasible. The suction pipe may therefore be used to evenly distribute fluid to a six-stage compressor.

Calculating the first and second fluid velocities may be based on the full load rating conditions for a predetermined multi-compressor device. The method may include designing the suction pipe to be adapted for use with the predetermined multi-compressor device.

Since the invention pertains to multi-compressor devices and compressors, references herein to "fluid" should be understood to encompass oil and/or a mixture of oil and refrigerant. Fluid referenced herein may be oil and/or a mixture of oil and refrigerant. The invention may therefore provide e.g. a method of manufacturing a suction pipe for oil equalisation for multi-scroll compressors.

According to a second aspect of the invention there is provided a refrigeration system comprising a multi-compressor device and a suction pipe manufactured according to the first aspect of the invention.

The refrigeration system may be heating, ventilation, and air conditioning (HVAC) system. The multi-compressor device may be a multi-scroll compressor or a multi-rotary compressor.

The suction pipe may comprise five or more secondary portions, and the multi-compressor device may be a multi-scroll compressor comprising five or more compressors, each compressor arranged to receive fluid from a respective secondary portion of the suction pipe. The suction pipe may comprise six or more secondary portions, and the multi-compressor device may be a multi-scroll compressor comprising six or more compressors, each compressor arranged to receive fluid from a respective secondary portion of the suction pipe.

Due to the higher fluid velocities and stable fluid distribution enables by the method disclosed herein, the operation map of the refrigeration system may be extended. Known refrigeration systems operate with fluid temperatures greater than about 6° C. or 7° C. (degrees Celsius). The method described herein enables a refrigeration system arranged to operate in a brine configuration. The system may be arranged to operate with a fluid (e.g., refrigerant) temperature of less than 0° C., or less than –5° C., or even less than –10° C. The system may be arranged to operate using refrigerant having temperatures less than –12° C.

The system may not comprise restrictor devices in the suctions, for example in the secondary portions of the suction pipe. The suction pipe may not comprise additional elements therein operable to restrict flow through any part of the suction pipe.

The system may be arranged to use a high-pressure refrigerant. The high pressure refrigerant may be R32, R454B, R452B, and/or R410A, or any suitable high pressure refrigerant. The system may comprise the high pressure refrigerant.

According to a third aspect of the invention there is provided a method of designing a suction pipe comprising a primary portion and a plurality of secondary portions arranged to receive fluid from the primary portion for supplying fluid in parallel to inlets of a multi-compressor device; the method comprising selecting dimensions of the suction pipe to ensure that: fluid velocity in the primary portion during use is greater than a first predetermined threshold; fluid velocity in the secondary portions during use is greater than a second predetermined threshold; and the ratio of the fluid velocity in the primary portion to fluid velocity in the secondary portions is greater than 1.5.

The first predetermined threshold may be 18 meters per second, and may be 18.0 meters per second. The second predetermined threshold may be 12 meters per second, and may be 12.0 meters per second. The ratio of fluid velocities may be greater than 1.50. The method may include any and all features of the invention described herein with reference to the first aspect of the invention.

According to another aspect of the invention, there is provided a method of designing a refrigeration system comprising manufacturing a suction pipe as described herein with reference to the first aspect of the invention. The method of designing the refrigeration system may comprise any and all of the features of the invention described herein with reference to the first aspect of the invention, or with reference to the third aspect of the invention. The method may comprise designing and/or manufacturing a refrigeration system as described herein with reference to the second aspect of the invention.

The method may comprise designing and manufacturing a heating, ventilation, and air-conditioning (HVAC) system, comprising manufacturing a suction pipe according to the first aspect of the invention. The method may comprise designing and manufacturing the system to use high pressure refrigerants. The method may comprise designing and/or manufacturing the system for use with fluids at a temperature of less than 0° C., less than –5° C., less than –10° C., and preferably less than –12° C.

According to another aspect of the invention there is provided a method of designing a suction pipe comprising: arranging a primary portion of the suction pipe to have a fluid velocity in use greater than a first predetermined threshold; arranging a secondary portion of the suction pipe to have a fluid velocity in use greater than a second predetermined threshold; and arranging the primary and secondary portions of the suction pipe so that in use the ratio of fluid velocity in the primary portion to fluid velocity in the secondary portion is greater than a third predetermined threshold. The first predetermined threshold may be 18 meters per second. The second predetermined threshold may be 12 meters per second. The third predetermined threshold may be 1.5. The method may comprise any and all of the features of the invention described herein with reference to any aspect.

BRIEF DESCRIPTION OF THE DRAWINGS

Certain preferred embodiments of the invention will be described below by way of example only and with reference to the drawing, in which.

DETAILED DESCRIPTION

Figure 1:
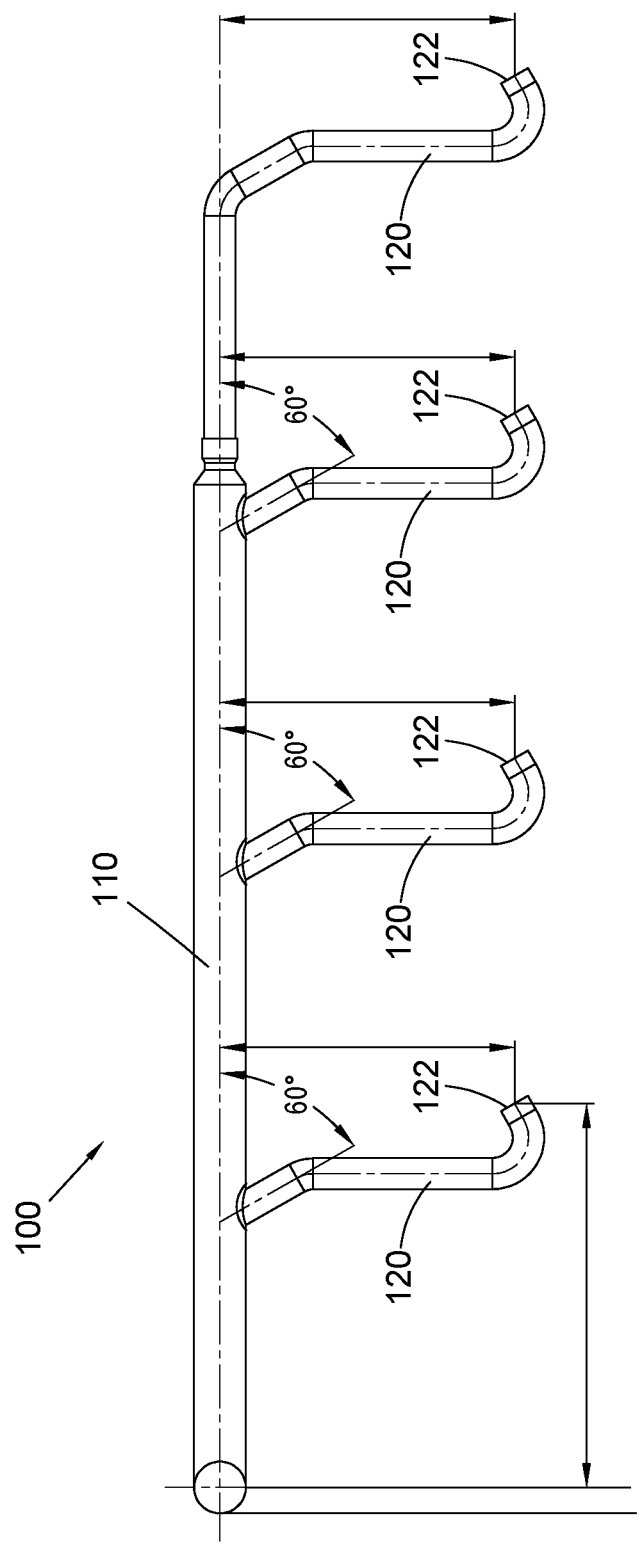
FIG. 1 is a suction pipe for a compressor device.

FIG. 1 shows a suction pipe 100 for a compressor device (not shown) which is a multi-scroll compressor. The suction pipe 100 comprises a primary portion 110 and a plurality of secondary portions 120. Each secondary portion 120 is arranged to receive fluid from the primary portion 110, and connects to the primary portion at a predetermined angle. The secondary portions 120 are arranged in parallel to each and each other and each have an outlet 122 for providing fluid to parallel inlets of the compressor device.

The primary portion 110 therefore distributes fluid (e.g. oil, or a mixture of oil and refrigerant) to the four secondary portions 120 during use, and each secondary portion 120 is arranged to provide fluid during use to a respective inlet of the multi-scroll compressor. However, although the suction pipe of FIG. 1 is shown with four secondary portions 120, a suction pipe 100 may have three, four, five, six, or more secondary portions 120 as required for the corresponding compressor. The design method described herein enables suctions pipes with more than four secondary portions 120.

The secondary portions 120 shown in FIG. 1 are connected at an angle of 60° to the primary direction of fluid flow through the primary portion 110, but any suitable angle may be used. The primary portion 110 has substantially the same internal diameter along its entire length, though the width reduces near the fourth secondary portion 120, at the end of the suction pipe 100. Each secondary portion 120 has substantially the same internal diameter along its length, though it may curve if needed, as shown in FIG. 1. Each secondary portion 120 has substantially the same internal diameter as the others.

The suction pipe 100 is used to distribute fluid between the inlets of the compressor device. Each secondary 120 is therefore substantially the same as the others, in order to ensure that fluid is distributed evenly. However, geometric imperfections in suctions pipes 100 designed by known methods will lead to uneven fluid distribution between the inlets. For example, the first secondary portion 120 may receive a greater amount of fluid than the second, which in turn may receive more than the third, which in turn may receive more than the fourth.

The method of designing a suction pipe 100 described herein ensures that fluid velocities (e.g. oil velocities) in the portions of the suction pipe have minimum thresholds, and therefore the geometry imperfections in the portions have a negligible effect on the fluid distribution.

Figure 2:
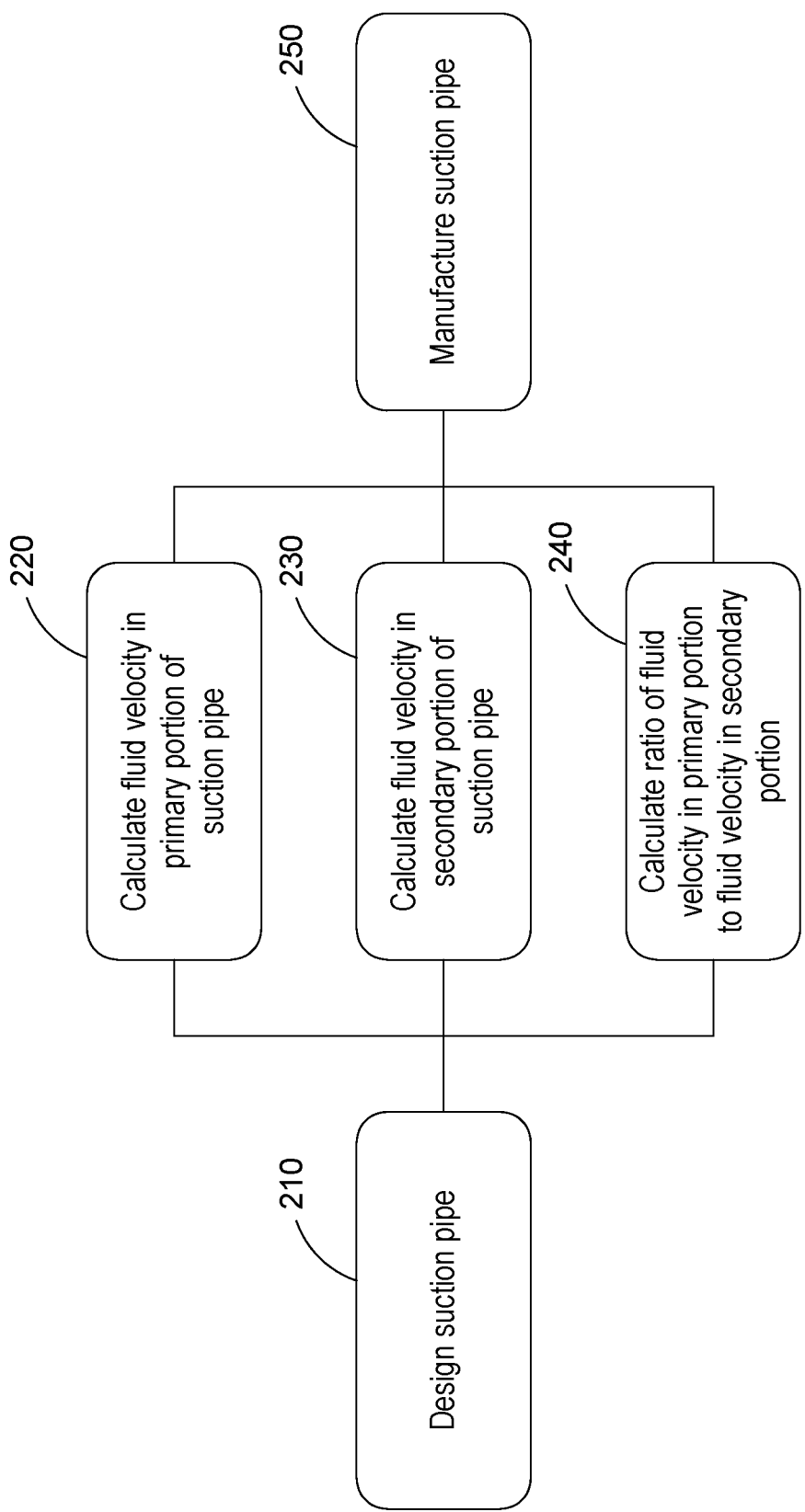
FIG. 2 shows a schematic of a method for manufacturing a suction pipe.

FIG. 2 shows a schematic of steps of a method of manufacturing a suction pipe. The method includes designing the suction pipe by ensuring that fluid velocities in the primary portion 110 and secondary portions 120 are greater than predetermined thresholds, and ensuring that the fluid velocity in the primary portion 110 is at least a minimum proportion greater than the fluid velocity in the secondary portions 120.

In contrast to known methods for designing a suction pipe 100, the method herein relies upon generating a sufficient pressure drop by requiring minimum velocity thresholds, in particular requiring minimum fluid velocity thresholds in the primary portion 110 and each secondary portion 120. Further, the method requires that the ratio between velocities is larger than a predetermined threshold.

At step 210, the method comprises designing the suction pipe, which comprises selecting dimensions of the suction pipe 100 e.g. based on a predetermined system, including selecting the internal pipe diameter for the primary portion 110, and the internal diameter of the secondary portions 120. The secondary portions 120 each have substantially the same internal diameter.

At step 220, the method comprises calculating the fluid velocity in the primary portion 110 of the suction pipe 100. The method may include calculating the fluid velocity for expected full load conditions for the suction pipe for a given multi-compressor in a predetermined system. The method then includes comparing the calculated fluid velocity in the primary portion 110 with a first predetermined threshold. The first predetermined threshold is 18 meters per second. Although alternative thresholds may be used for certain systems, the threshold of 18 meters per second for fluid velocity in the primary portion 110 has been found to provide particularly reliable results for a broad range of systems.

If the calculated fluid velocity is less than the first predetermined threshold, the method includes changing the selected dimensions of the primary portion 110 and recalculating the first fluid velocity. The method therefore comprises selecting dimensions of the primary portion 110 so that the expected fluid velocity therein is greater than the first predetermined threshold.

At step 230, the method includes calculating the fluid velocity in the secondary portions 110 of the suction pipe 100. The method may include calculating the fluid velocity for expected full load conditions for the suctions pipe for a given compressor in a predetermined system. The method then includes comparing the calculated fluid velocity in the secondary portions 120 with a second predetermined threshold. The second predetermined threshold is 12 meters per second. Although alternative thresholds may be used for certain systems, the threshold of 12 meters per second has been found to provide particularly reliable results for a broad range of systems, particularly in combination with the first predetermined threshold of 18 meters per second.

If the calculated fluid velocity in the secondary portions is less than the second predetermined threshold, the method includes changing the selected dimensions of the secondary portions 120 and recalculating the second fluid velocity. The method therefore comprises selecting dimensions of the secondary portions 120 so that the expected fluid velocity therein is greater than the second predetermined threshold.

At step 240 the method comprises calculating the ratio between the calculated fluid velocity in the primary portion 110 and the calculated fluid velocity in the secondary portions 120, and comparing that ratio to a third predetermined threshold. The third predetermined threshold is 1.5. Again, although different values may be used for the third predetermined threshold, the value of 1.5 has been found to be particularly effective and applicable to a wide range of systems, especially in combination with the first and second thresholds of 18 meters per second and 12 meters per second.

If the calculated ratio is smaller than the third predetermined threshold, then the method comprises changing the dimensions of the suction pipe 100 and recalculating the ratio. The method therefore comprises selecting dimensions for the suction pipe 100 to ensure that the fluid velocity in the primary portion 110 is at least 1.5 times greater than the fluid velocity in the secondary portions 120.

If all three calculated values are greater than the respective thresholds, then the method includes manufacturing the suction pipe 100 according to the design. If any one of the criteria is not satisfied, then the suction pipe 100 is not manufactured. The method may also include manufacturing an HVAC system comprising manufacturing a suction pipe as described herein.

The method described herein provides suction pipes that ensure substantially even fluid distribution between stages of a multi-compressor. As a result of the method, restrictor devices are not needed and systems may be less complicated. Further, efficiency of the design process is significantly increased because iterations of the design are not needed—there is a very high likelihood that the manufactured suction pipe will work first time. The method also enables refrigeration systems to operate with a wider range of parameters e.g. in a brine configuration with fluid temperature less than e.g. −10° C.

Moreover, the robust fluid distribution resulting from the design process allows suction pipes with five secondary portions and therefore systems with multi-scroll compressors with five compressors.

What is claimed is:

1. A method of manufacturing a suction pipe (100) for a multi-compressor device having a plurality of inlets, the suction pipe comprising a primary portion (110) and a plurality of secondary portions (120) arranged to receive fluid from the primary portion (110) for supplying fluid in parallel to the inlets of a multi-compressor device; the method comprising designing the suction pipe (100) by:

selecting a first dimension for the primary portion (110) of the suction pipe (100), calculating a first fluid velocity for fluid in the primary portion (110) based on the first dimension, and comparing the first fluid velocity to a first predetermined threshold;

selecting a second dimension for the secondary portions (120), calculating a second fluid velocity for fluid in the secondary portions (120) based on the second dimension, and comparing the second fluid velocity to a second predetermined threshold; and calculating a ratio of the first fluid velocity to the second fluid velocity;

the method further comprising:

manufacturing the suction pipe (100) according to the selected first dimension and the selected second dimension if the first fluid velocity is greater than the first predetermined threshold, if the second fluid velocity is greater than the second predetermined threshold, and if the ratio of the first fluid velocity to the second fluid velocity is greater than 1.5.

2. A method as claimed in claim 1, wherein the first predetermined threshold is 18 meters per second.

3. A method as claimed in claim 1, wherein the second predetermined threshold is 12 meters per second.

4. A method as claimed in claim 1, wherein the designing the suction pipe (100) comprises designing the suction pipe (100) to have three or more secondary portions (120).

5. A method as claimed in claim 1, wherein the designing the suction pipe (100) comprises designing the suction pipe (100) to have four or more secondary portions (120).

6. A method as claimed in claim 1, wherein the designing the suction pipe (100) comprises designing the suction pipe (100) to have five or more secondary portions (120).

7. A method as claimed in claim 1, wherein the calculating the first and the second fluid velocities is based on full load rating conditions for a predetermined multi-compressor device.

8. A refrigeration system comprising a multi-compressor device and a suction pipe (100) manufactured according to claim 1.

9. A refrigeration system as claimed in claim 8, wherein the suction pipe (100) comprises five or more secondary portions (120), and wherein the multi-compressor device is a multi-scroll compressor comprising five or more compressors, each compressor arranged to receive fluid from a respective secondary portion (120) of the suction pipe (100).

10. A refrigeration system as claimed in claim 8, wherein the multi-compressor device is arranged to operate with a fluid temperature of less than 10 degrees Celsius.

11. A method of designing a suction pipe (100) comprising a primary portion (110) and a plurality of secondary portions (120) arranged to receive fluid from the primary portion (110) for supplying fluid in parallel to inlets of a multi-compressor device; the method comprising selecting dimensions of the suction pipe to ensure that:

fluid velocity in the primary portion (110) is greater than a first predetermined threshold;

fluid velocity in the secondary portions (120) is greater than a second predetermined threshold; and a ratio of the fluid velocity in the primary portion to fluid velocity in the secondary portions is greater than 1.5.

12. A method as claimed in claim 11, wherein the first predetermined threshold is 18 meters per second.

13. A method as claimed in claim 11, wherein the second predetermined threshold is 12 meters per second.

14. A refrigeration system as claimed in claim 8, wherein the multi-compressor device is arranged to operate with a fluid temperature of less than 5 degrees Celsius.

15. A refrigeration system as claimed in claim 8, wherein the multi-compressor device is arranged to operate with a fluid temperature of less than 0 degrees Celsius.

* * * * *